(12) United States Patent
Mishra et al.

(10) Patent No.: US 6,594,685 B1
(45) Date of Patent: Jul. 15, 2003

(54) UNIVERSAL APPLICATION PROGRAMMING INTERFACE HAVING GENERIC MESSAGE FORMAT

(75) Inventors: Rajesh K. Mishra, West Yarmouth, MA (US); Vinayak V. Antarkar, West Yarmouth, MA (US)

(73) Assignee: Excel Switching Corporation, Hyannis, MA (US)

( * ) Notice: Subject to any disclaimer, the term of this patent is extended or adjusted under 35 U.S.C. 154(b) by 0 days.

(21) Appl. No.: 09/291,869

(22) Filed: Apr. 14, 1999

(51) Int. Cl.[7] .............................................. G06F 15/16
(52) U.S. Cl. ..................... 709/203; 709/206; 370/352; 370/399; 370/400
(58) Field of Search ........................ 711/100; 709/328, 709/203, 200; 395/200; 370/410, 399, 400, 352

(56) References Cited

U.S. PATENT DOCUMENTS

| | | | |
|---|---|---|---|
| 5,321,744 A | 6/1994 | Madonna et al. | 379/269 |
| 5,349,579 A | 9/1994 | Madonna et al. | 370/58.2 |
| 5,426,694 A | 6/1995 | Hebert | 379/242 |
| 5,680,551 A * | 10/1997 | Martino, II | 709/206 |
| 5,706,437 A | 1/1998 | Kirchener et al. | 395/200 |
| 5,826,030 A * | 10/1998 | Hebert | 709/203 |
| 5,960,004 A * | 9/1999 | Ramstrom et al. | 370/400 |
| 6,259,691 B1 * | 7/2001 | Naudus | 370/352 |
| 6,421,705 B1 * | 7/2002 | Northrup | 709/203 |
| 6,449,280 B1 * | 9/2002 | Christie | 370/399 |

FOREIGN PATENT DOCUMENTS

EP 0555997 8/1993

* cited by examiner

*Primary Examiner*—John Follansbee
*Assistant Examiner*—Lilian Vo (57) ABSTRACT

The present invention is a universal application program interface (API) utilizing a generic message format for performing call control processing and capable of being customized to meet telecommunications application and network signaling protocol requirements. The generic message formats have programmable fields for transmitting commands, status, and data between the host application and the switch. The present invention further provides the switch the ability to perform switching functions between ports associated with distinct protocols without supervision from the host application. The universal API of the present invention may be implemented to achieve communications internal to the switch as well. For example, the generic messages of the universal API may be used to support communications between any software layer within the switch.

10 Claims, 9 Drawing Sheets

APPLICATION LAYER (LAYER 5)

- MATRIX/LINE CARD MANAGEMENT
    DOWNLOAD CONTROL
    ALARM PROCESSING
    REDUNDANT MATRIX CONTROL
- CONFIGURATION MANAGEMENT
    MATRIX CONFIGURATION
    LINE CARD CONFIGURATION
- HIGH LEVEL (LAYER 5) CALL PROCESSING
    INTERACTIVE DIGIT COLLECTION
    RECORDED ANNOUNCEMENT CONTROL FOR INTERACTIVE
        VOICE RESPONSE APPLICATION SUPPORT
    BROADCASTING/CONFERENCING CONTROL
    INBOUND CALL ROUTING/QUEUING
    OUTBOUND CALL INITIATION WITH DIGIT OUTPULSING
    ADDRESS DIGIT ROUTING TO CHANNELS/CHANNEL GROUPS
    CALL HUNTING FOR OUTBOUND CHANNEL SELECTION
    CALL PROGRESS TONE CONTROL FOR INBOUND/
        OUTBOUND CALLS
    MULTIPLE CALL MGMT FEATURES (TRANSFER, HOLD,
        CONFERENCING, CALLBACK, FORWARDING, ETC.)
    CALL DETAIL RECORDING

CALL MANAGEMENT LAYER (LAYER 4)

INTERACTIVE RECORDED ANNOUNCEMENT CONTROL (USER
        DIGIT DRIVEN)
    LAYER 4/APPLICATION LAYER (LAYER 5) INITIATED CALL PARK
    1-WAY/2-WAY/CONFERENCE CONNECTION MANAGEMENT
    RECONNECTION (TRANSFER)
    LAYER 4 OUTGOING OUTSEIZE INITIATION FOR 2-WAY CONNECTIONS
    MULTIPLE CALL MGMT FEATURES (TRANSFER, HOLD, CONFERENCING,
    CALLBACK, FORWARDING, ETC.)
    CUSTOMIZATION OF INSEIZE COMPLETION REPORT SENT TO THE
        APPLICATION LAYER (LAYER 5)

NETWORK PROTOCOL LAYER (LAYER 3)

- IN BAND LINE/ADDRESS SIGNALLING CONTROL
    E&M INTERFACE
    LOOPSTART, GROUNDSTART TRUNK INTERFACES
    LOOPSTART, GROUNDSTART LINE INTERFACES
    MULTI-WINK MFR1 FEATURE GROUP D
    DTMF DIALED NUMBER INDENTIFICATION SERVICES (DNIS)
    COMPELLED R2 FOR INTERNATIONAL E1 INTERFACES
    IN BAND/EXTENDED IN BAND/MULTI-WINK COIN SIGNALLING
    CUSTOM T1/E1 SERVICE CARD INTERFACES
- OUT OF BAND SIGNALLING CONTROL
    ISDN PRIMARY RATE LAYER 3 Q.931
    SS7 ISDN USER PART (ISUP)

FIG. 3A

LINK LAYER (LAYER 2)

- T1 ROBBED BIT SIGNALLING SCANNING
- E1 CHANNEL ASSOCIATED SIGNALLING SCANNING
- T1/E1 LINE INTERFACE FRAME ALARM CONTROL
- DSP TONE RECEPTION CONTROL
  IN BAND ADDRESS SIGNALLING (MFR1, MFR2, DTMF)
  CALL PROGRESS ANALYSIS
- DSP TONE GENERATION CONTROL
  IN BAND ADDRESS SIGNALLING (MFR1, MFR2, DTMF)
  CALL PROGRESS TONE GENERATION
  CUSTOM CALL PROGRESS TONE GENERATION
- SS7 MTP2/MTP3
- DSP RECORDED VOICE ANNOUNCEMENT CONTROL
- DSP CONFERENCE GENERATION CONTROL
- GENERIC DSP FUNCTION CONTROL
  DSP PROCESSOR TO MFDSP MAIN PROCESSOR DSP CONTROL/
      INFORMATIONAL MESSAGES
  MFDSP MAIN PROCESSOR TO DSP PROCESSOR CONTROL/
      INFORMATIONAL MESSAGES
  MFDSP MAIN PROCESSOR DSP FUNCTION ANALYSIS/CONTROL
- LAPD Q.921

FIG. 3B

| TAG 402 | LENGTH 404 | VALUE 406 |

UNIVERSAL PROTOCOL FORMAT DATA STRUCTURE 400

FIG. 4

| DESCRIPTION | CONTENTS |
|---|---|
| TAG 502 | 0 x 17 |
| LENGTH 504 | NUMBER OF BYTES BELOW (STARTING WITH DATA [0]) |
| DATA [0] 506 | TYPE OF NUMBER (FIG. 5B) |
| DATA [1] 507 | NUMBERING PLAN IDENTIFIER (FIG. 5C) |
| DATA [2] 508 | NUMBER OF DIGITS |
| DATA [3] 509 | DIGITS |
| DATA [4] 510 | DIGITS |
| ... 514 | ... |

FIG. 5A

| INN INDICATOR 506a | REVERSE CHARGE INDICATOR 506b | INTERNATIONAL NUMBER 506c | NATIONAL NUMBER 506d | NETWORK SPECIFIC NUMBER 506e | SUBSCRIBER NUMBER 506f | ABBREVIATED NUMBER 506g |
|---|---|---|---|---|---|---|

FIG. 5B

| ISDN 508a | DATA 508b | TELEX 508c | NATIONAL STANDARD 508d | PRIVATE 508e |
|---|---|---|---|---|

UNIVERSAL APPLICATION PROGRAMMING INTERFACE HAVING GENERIC MESSAGE FORMAT

BACKGROUND OF THE INVENTION

The present invention relates generally to the field of telecommunications and, more specifically, to a universal application programming interface (API) for translating various network signaling protocols into a standardized protocol.

DESCRIPTION OF THE RELATED ART

Programmable telecommunication switches are used in a wide variety of applications such as voice messaging, telemarketing services and the like. A programmable switch is usually controlled by a host device, which is typically a computer that runs a telecommunications application program. A customer may either purchase a commercially available application program that is compatible with the host and switch hardware or may elect to write a custom program.

In most applications, the switch comprises line cards with multiple ports. Each line card terminating one or more analog trunks or digital spans (e.g., a T1 span) that are connected to other devices such as PSTN trunks. Line cards may also terminate one or more 'lines' which are connected to devices such as telephone sets. The switch also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards. Communication over any given trunk, span or line is carried out in accordance with an assigned signaling protocol.

Switches in telecommunications systems are interconnected by an internodal switching network. A second network termed the "host network," interconnects the switches and the host computer for supervisory control. The host, the switches and the line cards each includes a software protocol application that processes calls at its level of the system. Specifically, a Layer 5 (L5) protocol application in the host manages calls at the host level; a Layer 4 protocol application (L4) in the switch manages calls at the switch level; and Layer 3 (L3) protocol applications in the line cards handle calls at the line card level of the system.

For various switching system applications, the sequence of switching events must be controlled and the switching functions must be performed in accordance with the requisite protocols. Throughout the world, there are numerous "standard" signaling protocols in use, including E&M wink start, loopstart, groundstart, international compelled R2 using MFR2 address signaling, and E1 Channel Associated Signaling (CAS) protocols using DTMF/MFR1 signaling. Typically, conventional programmable switches are configured such that a particular signaling protocol is associated with a particular trunk, span or line.

The system described above is usually connected to other telecommunications systems in a broader telecommunications network. Each L3 application in a line card receives the underlying network signaling messages in units such as, packets or frames, and it transmits these units to the L4 application. Messages entering the L3applications are structured according to specific protocols associated the respective systems on the network from which they originate or terminate. Thus, the L4 application must convert messages between different protocols in order to perform switching functions on calls originating and terminating on ports associated with distinct network signaling protocols.

Furthermore, conventional programmable switches may be connected between the public telephone network and other devices such as a voice messaging system. Because such devices may perform specialized functions and are not intended to connect directly to the public telephone network, they do not typically adhere to standard signaling protocols. Thus, for a user to be able to control the programmable switch in such a fashion that proper communication is maintained both, with the public telephone network and with other devices connected to the switch, complex and varied signaling protocol requirements must be satisfied. Conventional communications switches implement numerous specific sets of application programming interface (API) messages to support these varied requirements.

As a result of the various telecommunications applications and signaling protocol requirements, there has been no standardization of the interface between the host applications, the switch and external systems or devices. This has led to increased cost in developing the necessary hardware and software to support specific protocols to satisfy host applications requirements as well as signaling protocol requirements for each trunk, span, and line.

Furthermore, as a result of having separate and distinct API messages and formats, each dedicated to a specific command or data transfer, the addition of features to the telecommunications switch necessitates the creation and implementation of one or more additional API messages and or formats to support the associated signaling protocol. To implement each new unique message, a costly and time-consuming software change to the switch and host must be made.

What is needed, therefore, is a universal API that provides standardized call control processing by utilizing one or more generic message formats and supporting host-to-switch and switch-to-line card call control processing that may be used regardless of the host application or signaling protocol requirements. Furthermore, the generic message formats must be sufficiently flexible and versatile to be customized to support present and future requirements of telecommunications applications and signaling protocols now or later developed.

SUMMARY OF THE INVENTION

The present invention is a universal application program interface (API) utilizing a generic message format for performing call control processing and capable of being customized to meet telecommunications application and network signaling protocol requirements. The generic message formats have programmable fields for transmitting commands, status, and data between the host application and the switch. The present invention further provides the switch the ability to perform switching functions between ports associated with distinct protocols without supervision from the host application.

The universal API of the present invention may be implemented to achieve communications internal to the switch as well. For example, the generic messages of the universal API may be used to support communications between any software layer within the switch.

An advantage of the generic message structure of the present invention is that it provides the commonality and flexibility necessary to be a generic interface for application development. This significantly reduces the complexity of the host/switch communications interface and eliminates the cost of supporting an interface composed of numerous specialized messages and formats.

Another advantage of the present invention is that it enables call switching among multiple distinct network signaling protocols and between these protocols and a distinct host protocol by translating messages in each protocol to the universal API. Thus, the structure of the messages comprising the host-to-switch interface may remain unchanged despite the multiple signaling protocols supported by the switch.

Further features and advantages of the present invention as well as the structure and operation of various embodiments of the present invention are described in detail below with reference to the accompanying drawings. In the drawings, like reference numbers indicate identical or functionally similar elements. Additionally, the left-most one or two digits of a reference number identifies the drawing in which the reference number first appears.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A and 3B depict some of the specific features and functions associated with each of the software layers depicted in FIG. 2;

DETAILED DESCRIPTION OF AN ILLUSTRATIVE EMBODIMENT

Figure 1:
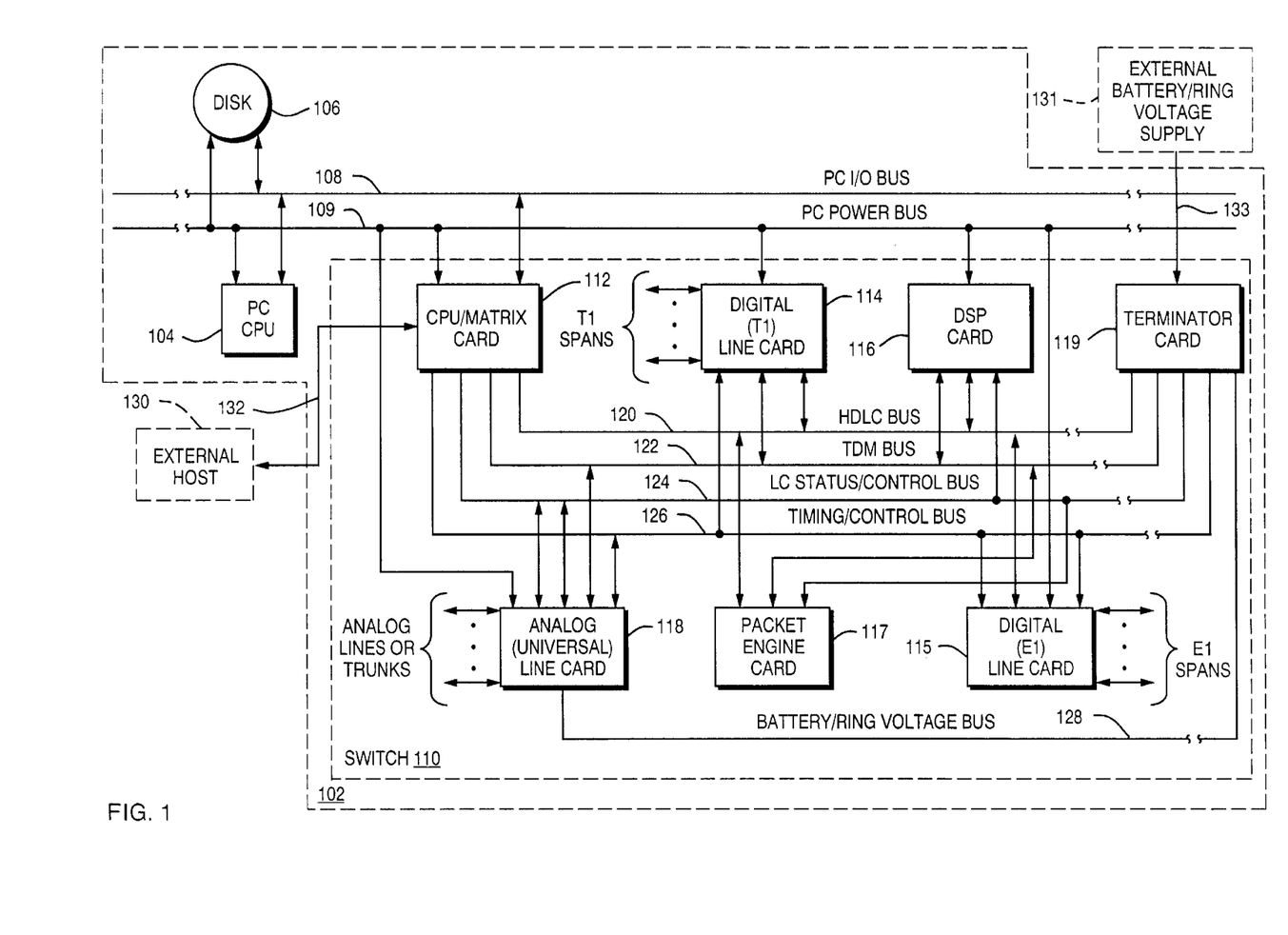
FIG. 1 is a block diagram of a programmable telecommunications switch which may be programmed by a user in accordance with a preferred embodiment of the present invention.

FIG. 1 shows a commercially available personal computer (PC) 102 which includes a PC central processing unit (CPU) 104 and a hard disk drive 106 interconnected by a PC input/output (I/O) bus 108 and a PC power bus 109. The PC 102 is preferably a PC-AT®, sold by International Business Machines (IBM), or a compatible thereof. Other personal computers having more memory or more powerful CPUs than the PC-AT® may also be used. The PC 102 preferably operates under an application-oriented operating system, such as DOS® or UNIX®.

The PC 102 consists of a chassis or housing in which a motherboard is mounted, along with the disk drive 106 and other optional assemblies such as floppy disk drives, modems and the like. The PC CPU 104 is mounted on the motherboard, which includes a series of edge connectors into which other boards (cards) may be inserted and thereby connected to the PC I/O and power busses 108 and 109.

A programmable telecommunication switch 110 resides within the PC 102. A CPU/matrix card 112 is inserted into one of the slots on the motherboard and thus connected to the busses 108 and 109. The CPU/matrix card 112 is interconnected with a digital (T1) line card 114, a digital (E1) line card 115, a digital signal processing (DSP) card 116, a packet engine card 117, an analog (universal) line card 118 and a terminator card 119 by four busses: a high level data link control (HDLC) or interprocessor bus 120; a time division multiplex (TDM) bus 122; a line card (LC) status/control bus 124; and a timing/control bus 126. A battery/ring voltage bus 128 supplies battery voltage (48VDC) and ringing voltage (109VAC) to the analog line card 118. The terminator card 119 serves to physically terminate busses 120, 122, 124, 126 and 128.

The line cards 114, 115 and 118 and the DSP card 116 are all connected to and receive their basic operating power from the PC power bus 109. Although only one digital (T1) line card 114, one digital (E1) line card 115 and one analog line card 118 are depicted, it should be understood that additional line cards of any type may be added subject to two physical limitations: (1) the maximum switching capacity of the CPU/matrix card 112, and (2) the physical space within the chassis of the PC 102.

An external host 130, which may comprise a separate personal computer, workstation or other computer, may optionally be connected via a communication channel 132 to the CPU/matrix card 112. The CPU/matrix card 112 preferably includes a conventional RS-232 compatible interface for connecting the channel 132. The external host 130 preferably operates under an application-oriented operating system.

If desired, the switch 110 can reside on a passive backplane (no PC CPU 104 or disk 106 present) from which its receives electrical power and be controlled by the external host 130. For example, the present invention may be implemented in other processing platforms such as the expandable telecommunications switch disclosed in copending patent application, Ser. No. 08/207,931, titled Expandable Telecommunications System, assigned to the assignee of the present application and which is hereby incorporated by reference in its entirety.

An external battery/ring voltage supply 131 is connected via a path 133 to the terminator card 119. Supply 131 may comprise, for example, a commercially available power supply.

With the exception of the digital (E1) line card 115, the DSP card 116 and the packet engine card 117, details regarding the construction of the various cards shown in FIG. 1 are set forth in U.S. Pat. No. 5,321,744, titled Programmable Telecommunications Switch for Personal Computer, assigned to the assignee of the present application and which is hereby incorporated by reference in its entirety. Digital (E1) line card 115 is preferably constructed using similar hardware to that disclosed for T1 line card 114, except for differences in conventional circuitry which allow line card 115 to terminate E1 spans as opposed to T1 spans.

Details regarding the construction of the DSP card 116 and the packet engine card 117 are set forth in U.S. Pat. No. 5,349,579, titled Telecommunications Switch With Programmable Communications Services, assigned to the assignee of the present application and which is hereby incorporated by reference in its entirety.

Figure 2:
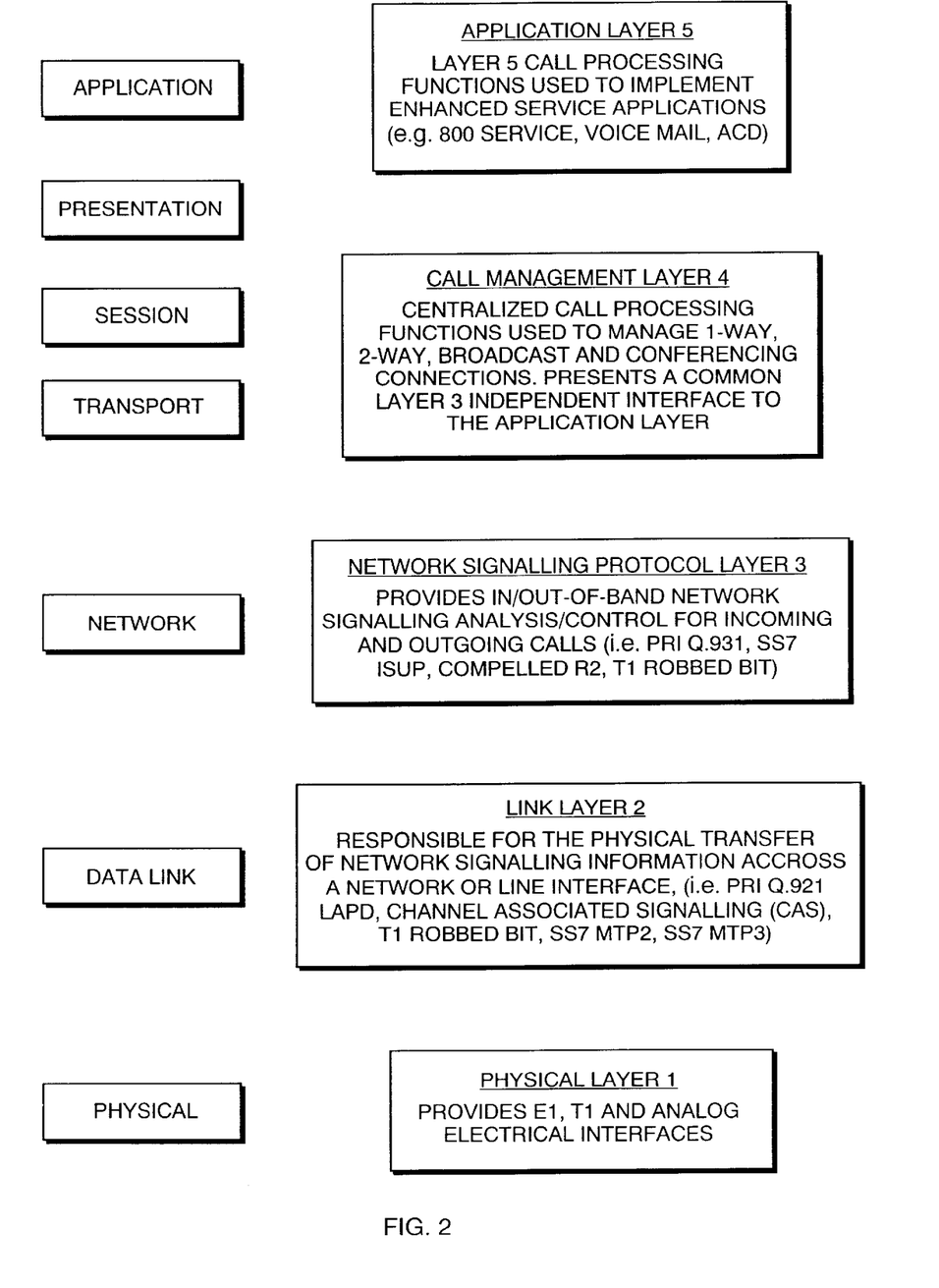
FIG. 2 is diagram which depicts the layers of software used to control the switch of FIG. 1.

FIG. 2 is a layer model of the software used to control the programmable switch 110 of FIG. 1. The left-hand column of FIG. 2 shows seven layers defined in the Open Systems Interconnection (OSI) reference model. The right-hand column of FIG. 2 shows five layers used to control the switch 110 and their general correspondence to the OSI model.

Referring now to both FIGS. 1 and 2, the Application Layer 5 (L5) in the host, which corresponds generally with the Application layer of the OSI model, represents application software which typically runs on either the PC CPU 104 or the external host 130. L5 software may be used to implement any of a number of desired telecommunications services such as toll free (800) service, voice mail, automatic call distribution (ACD), to name but a few. L5 may communicate with any other layer of the programmable switch through the universal application program interface (API) of the present invention. When L5 resides on external host 130, the API manages communications over communication channel 132. When L5 resides on PC CPU 104, the API manages call control processing communications over PC I/O bus 108.

Call Management Layer 4 (L4) in the switch, which corresponds generally with the Presentation, Session and Transport layers of the OSI model, represents software which runs on the CPU/matrix card 112. L4 is responsible for performing centralized call processing functions and providing a common interface to L5 regardless of the type or types of network signaling protocols which may be used within the switch 110. Typically, L4 performs functions which are required following call setup.

Network Signaling Protocol Layer 3 (L3) corresponds generally with the Network layer of the OSI model. The software represented by L3 runs either on the CPU/matrix card 112 or on line cards which include their own microprocessors, such as line cards 114 or 115 or packet engine card 117, and is responsible for in and out-of-band network signaling supervision as well as network protocol level control of incoming and outgoing calls. L4 may also communicate with L3 through the universal application program interface (API) of the present invention.

Link Layer 2 corresponds generally with the Data Link layer of the OSI model. Link Layer 2 software runs on the CPU/matrix card 112, the line cards which include their own microprocessors, the DSP card 116 or the packet engine card 117 (each of which includes its own microprocessor) and is responsible for the detection as well as physical transfer of network signaling information across a network or line interface.

Finally, the Physical Layer 1 corresponds to the Physical layer of the OSI model. Line cards 114, 115 and 118 provide physical T1, E1 and analog electrical interfaces, respectively, to the switch 110.

Figure 3B:
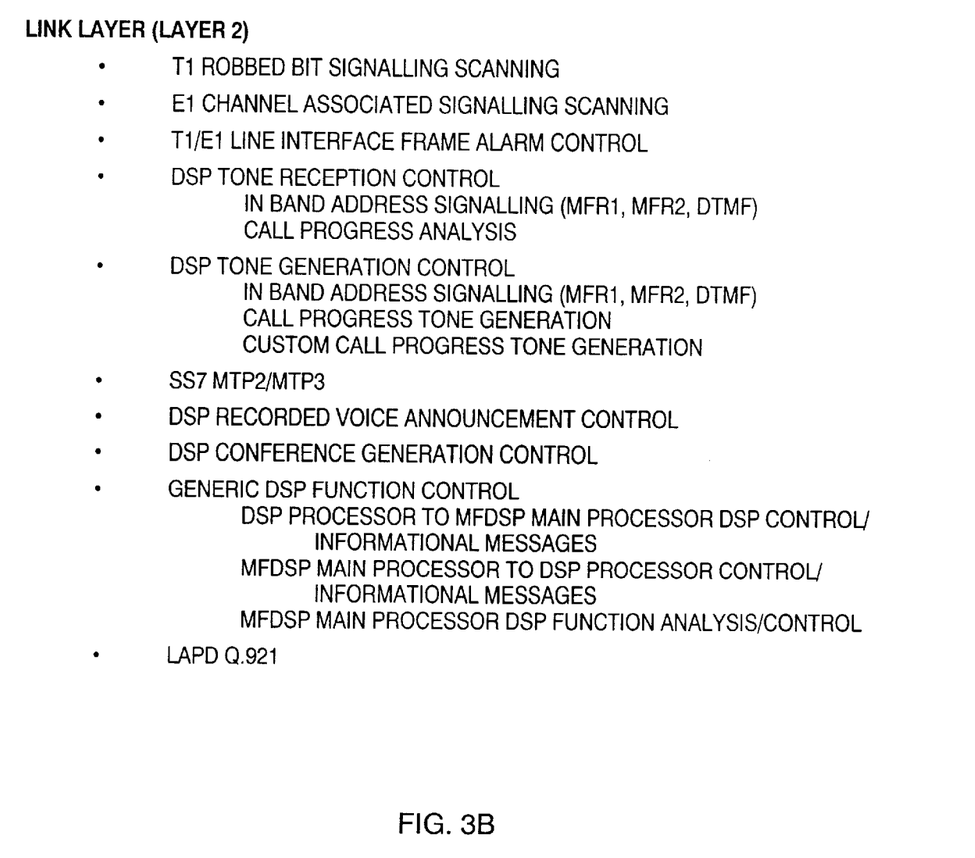

FIGS. 3A and 3B are a tabular listing of representative features and functions provided by each of the software Layers 2–5 of FIG. 2. The present invention may be used as a development tool to develop suitable software to implement any of the features and functions shown in FIGS. 3A and 3B. Illustrative examples of the use of the present invention in the context of each of Layers 2–5 are set forth in U.S. Pat. No. 5,426,694, assigned to the assignee of the present invention, herein incorporated by reference in its entirety.

Figure 4:
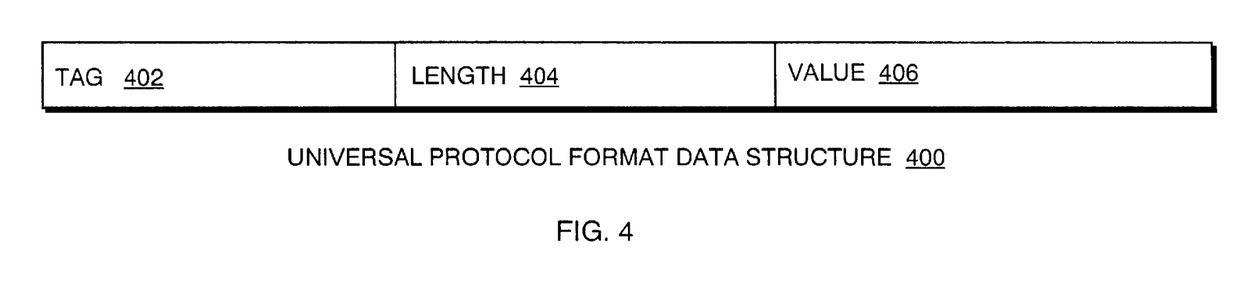
FIG. 4 depicts the universal API data structure used by the switching system.

FIG. 4 depicts the universal API data structure 400 used by the switching system. The data structure contains one or more sets of logical data and each set has three sections. The first section contains a tag field 402 which identifies the data. The second section indicates the length 404 of the data and the third section contains one or more fields 406 for storing the data itself.

Figure 5A:
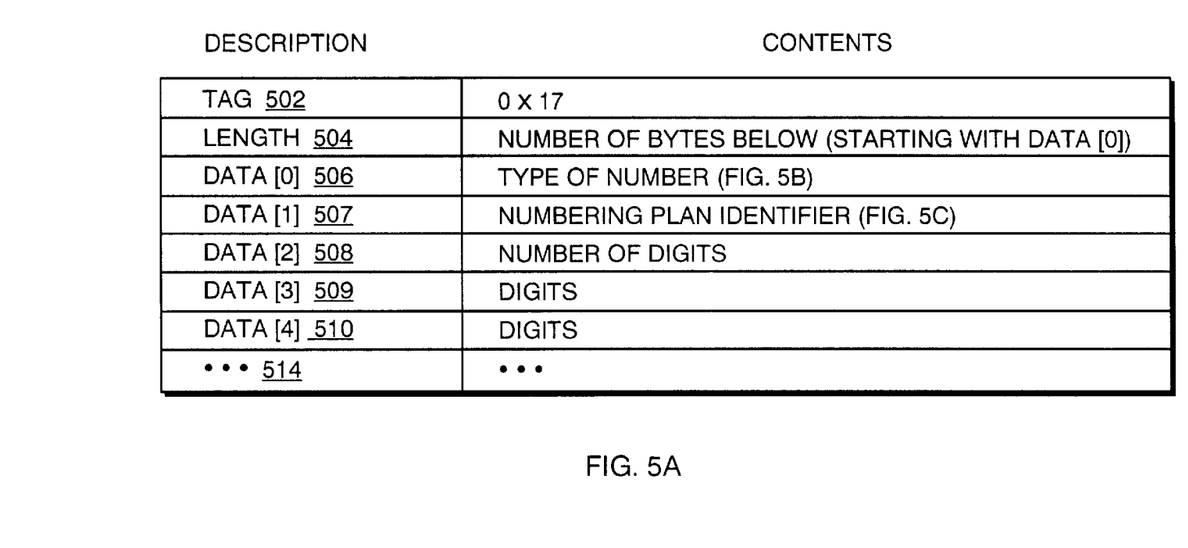
FIG. 5A is an example of the universal API data structure that represents a called party number.
Figure 5B:
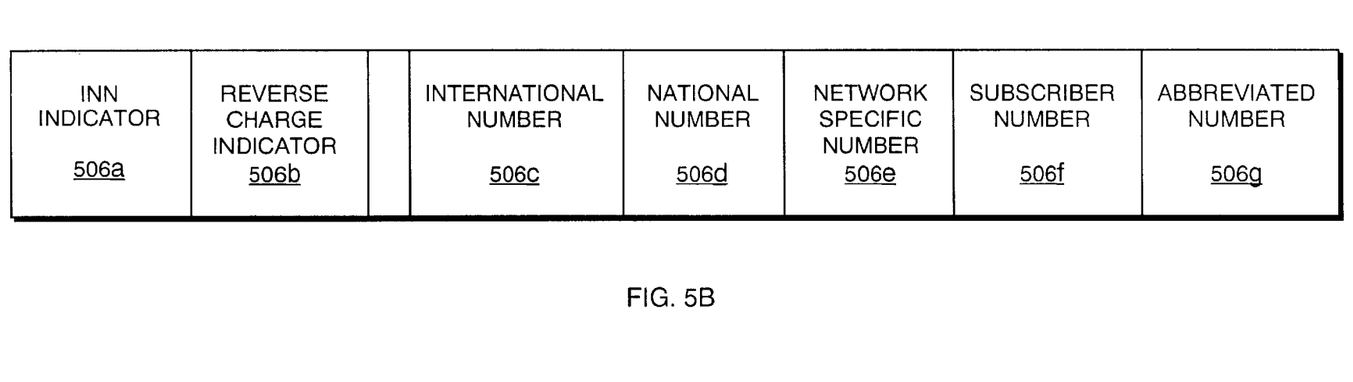
FIG. 5B describes of the data contents in the type of number field.
Figure 5C:
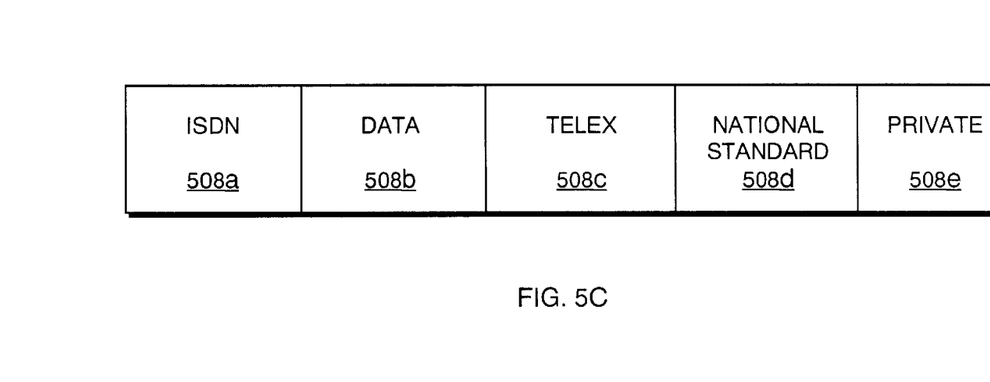
FIG. 5C describes of the data contents in the numbering plan identifier field.

FIGS. 5A–5C is an example of the universal API data structure that represents a called party number. The content of the tag field 502 indicates that a called party number is stored in the data structure; the length field 504 content indicates the length of the data; and the data fields contents 506–514 represent data associated with the called party number. FIG. 5B describes of the data contents of the type of number field 506. The first bit 506a of the type of number field 506 indicates whether international number routing is allowed; the second bit 506b indicates whether reverse charge is requested; and the fourth to eighth bits respectively indicate whether the number is an international number, a national number, a network specific number, a subscriber number and an abbreviated number. FIG. 5C describes the data contents in the numbering plan identifier field 508. The bits in the numbering plan identifier field 508a–508e respectively indicate whether the numbering plan is ISDN, Data, Telex, National Standard or Private plan.

Figure 6:
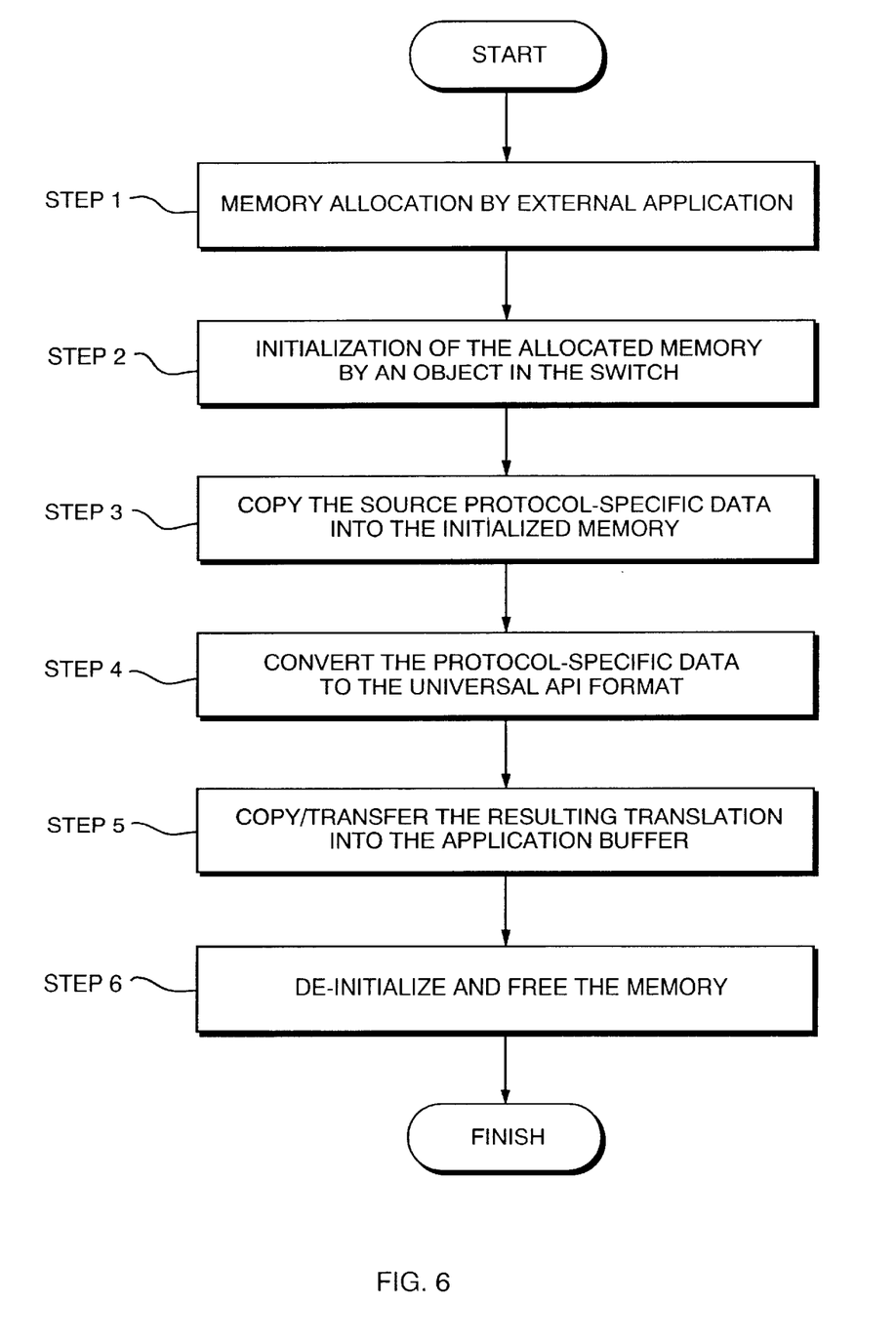
FIG. 6 describes the steps performed by an application using the universal API during a 'normal' call flow.

FIG. 6 describes the steps performed by an application using universal API for accessing incoming signaling message during a 'normal' call flow. The application may be either the an object in the L4 application or it may be the host L5 application. In Step 1, the application allocates a first memory buffer where the incoming data is to be stored. In Step 2, the application invokes an object in the switch which initializes the allocated memory. The application copies incoming protocol-specific data into the initialized buffer in Step 3. In Step 4, the application calls the object in the switch to convert the protocol specific data into the universal API format. In Step 5 the application copies the resulting translation in the universal API into a second memory buffer. In Step 6 the object in the switch de-initializes the first buffer and the application releases the de-initialized memory.

Figure 7:
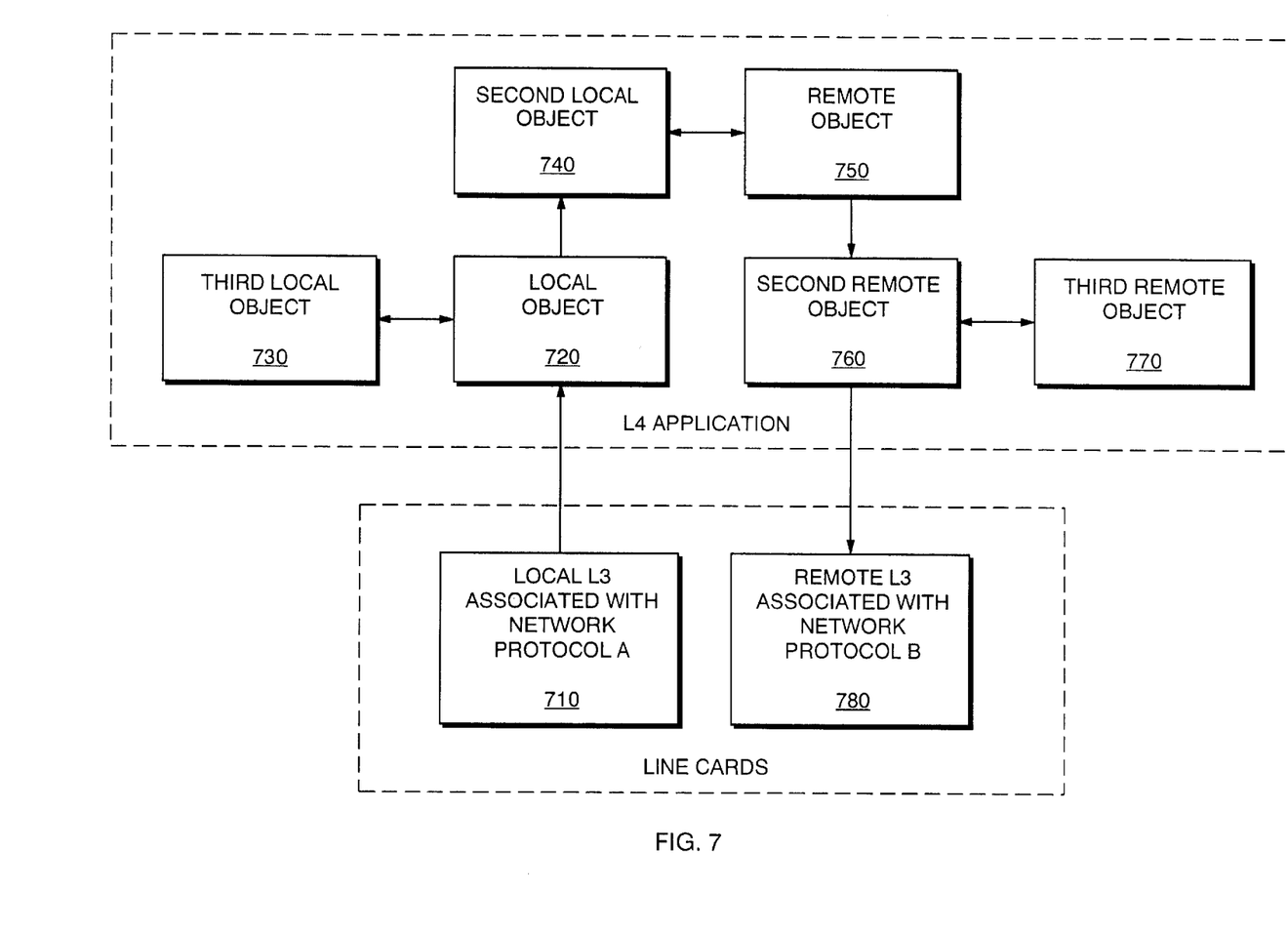
FIG. 7 is a data flow diagram of how the L4 application converts protocol specific data into the universal API message format in order to transfer data across ports associated with distinct protocols.

FIG. 7 is a data flow diagram of how the L4 application converts protocol-specific data into the universal API format in order to exchange information across systems using dissimilar protocols. A local L3 application 710 transmits a network signaling message from a system using Protocol A to a local object 720 in the switch. The local object 720 checks a format field in the incoming message to determine if the message is in the universal API format. If it is, the local object 720 forwards the message to a second local object 740 for further transmission to a remote object 750 in the switch. If it is not in the universal API format, the local object 720 transmits the message to a third local object 730 for conversion to the universal API format. Upon receiving the converted message, the local object 720 forwards the universal API message to the second local object 740 for further transmission to the remote object 750. The remote object 750 forwards the message to a second remote object 760. If the network system connected to a remote L3 application 780 does not 'understand' the universal API format, the second remote object 760 forwards the message to a third remote object 770 for conversion from the universal API format to the network signaling protocol associated with the remote L3 application 780. The third remote object 770 converts the message and returns it to the second remote object 760, which in turn, transmits it to the remote L3 application 780 for further transmission to a system using Network Protocol B.

Figure 8:
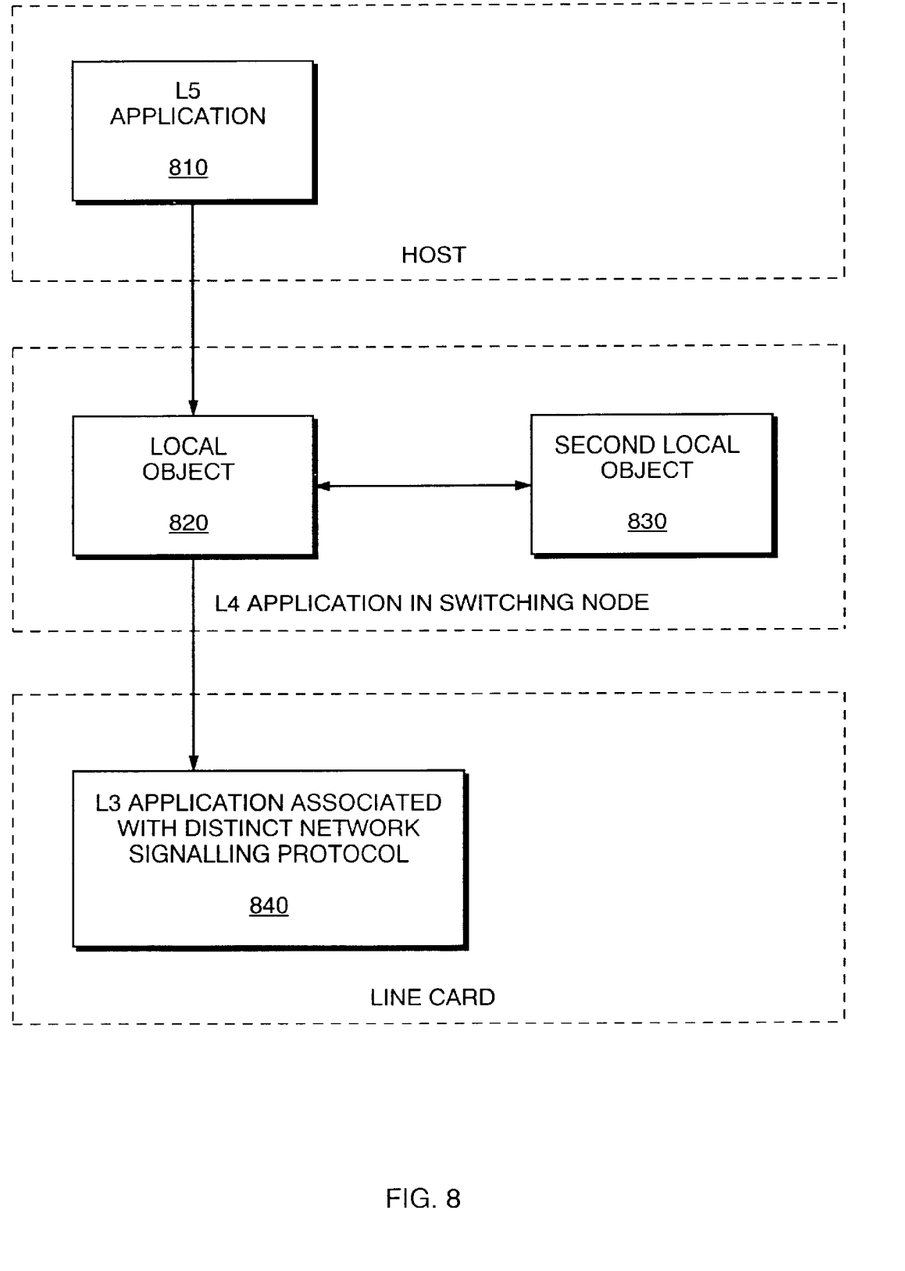
FIG. 8 is a data flow diagram of how the L4 application converts protocol specific data from the L5 host application into a dissimilar network signaling protocol.

FIG. 8 is a data flow diagram of how the L4 application converts messages from the L5 application 810 using one protocol into equivalent messages in distinct protocols. The L5 application 810 in the host transmits host-protocol-specific messages to a local object 820 in the switch. The local object 820 transfers the messages to a second local object 830 for conversion from the host protocol to a distinct network signaling protocol. Upon receiving the converted message from the second local object 830, the local object 820 then transmits the messages to the L3 application 840 associated with the distinct protocol through the usual process.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method of communicating between an external processing source transmitting source protocol-specific data and the application layers of a telecommunications switch in a telecommunications system that connects ports that communicate with external telecommunications networks, and the telecommunications system including a host for supervisory operations, and the switch including a first memory buffer, the method including the steps of:

allocating memory space in said first memory buffer for incoming data;

initializing said allocated memory space;

copying source protocol-specific data into said initialized memory;

providing functionality in said switch for converting said protocol-specific data into a universal applications program interface message format, within said switch without host intervention; and transferring the resulting translation into an application buffer in a particular application layer.

2. The method of communicating as defined in claim 1 wherein said step of providing said functionality for converting said protocol-specific data into a universal messaging format in said switch, including the further steps of:

providing a first local object in said switch that includes means for checking a format of an incoming message to determine whether said incoming message is in a universal API format, and, if it is determined that said incoming message is in said universal API format, then forwarding said incoming message in said universal API format to a second local object provided in said switch for further transmission to a first remote object in said switch for transmission to an intended destination; and upon said first local object determining that an incoming message is not in universal API format, then transmitting the message to a third local object provided in said switch that includes means for converting said protocol-specific data into a universal messaging format and forming said incoming message data into a data structure including a tag field, a length field, and a value field, and forwarding a then converted message to said second local object for further transmission to a first remote object in said programmable switch for transmission to an intended destination.

3. The method of communicating as defined in claim 2 wherein said protocol-specific data comprises a called party number and converting said data includes translating said data into a universal message format including employing as said value field a data structure which includes a type of number, numbering plan identifier, the number of digits comprising the number, and the digits comprising the number itself.

4. The method of communicating as defined in claim 3 including the further step of:

communicating in said type-of-number field information specifying an international number routing indication, a reverse charge indicator and an international number itself.

5. The method of communicating as defined in claim 3 including the further step of:

communicating as said type-of-number field information specifying whether the number is a national number.

6. The method of communicating as defined in claim 4 including the further step of communicating in said type-of-number field information specifying a network specific number.

7. The method of communicating as defined in claim 4 including the further step of:

communicating in said type-of-number field at least one of a subscriber number and an abbreviated number.

8. The method of communicating as defined in claim 4 including the further step of:

including in said numbering plan identifier field one of ISDN, DATA, TELEX, NATIONAL STANDARD, and PRIVATE.

9. The method of communicating as defined in claim 2 including the further steps of:

providing a second remote object in said switch that includes means for communicating with a remote destination port application to determine whether said remote destination port application is compatible with said universal API format, and if said remote destination port application is so compatible, then forwarding said converted message to said remote destination port;

if it is determined by said second remote object that said remote destination port application is not compatible for messaging in said universal API format, then forwarding said converted message to a third remote object for translating into a destination format used by said remote destination port application, and transmitting said translated message to said remote destination port.

10. The method of communicating as defined in claim 2 including the further steps of:

providing in said switch a first local object coupled with a software application running in said host, as a first host-messaging local object;

said first host messaging local object receiving messages in a host-protocol specific message format and transferring said messages to a second host-messaging local object in said switch;

said second host-messaging local object converting said message from the host protocol to a distinct network signaling protocol and returning the converted message to the first host-messaging local object; and said first host-messaging local object transmitting the converted message to a line card application associated with said distinct network signaling protocol.

* * * * *